United States Patent Office 3,359,339
Patented Dec. 19, 1967

3,359,339
PROCESS FOR THE PREPARATION OF CYCLOHEXENE AND ALKYL-SUBSTITUTED CYCLOHEXENES
Masataka Amagasa, Tadashi Yamaguchi, and Yoshiro Saito, Sendai-shi, Japan, assignors to Chiyoda Kakokensetsu Kabushiki Kaisha, Tokyo, Japan, a corporation of Japan
No Drawing. Filed Mar. 17, 1965, Ser. No. 440,631
7 Claims. (Cl. 260—666)

The present invention relates to a novel process for preparing cyclohexene and alkyl-substituted cyclohexenes from un-conjugated dihydrobenzene and non-conjugated alkyl-substituted dihydrobenzene through carrying out a reduction in the presence of a catalyst.

More particularly, the present invention relates to a novel process to prepare cyclohexene and alkyl-substituted cyclohexene from unconjugated dihydrobenzenes in such a manner that a partial catalytic reduction is carried out under atmospheric pressure or under an additional gauge pressure of hydrogen in the presence or absence of a solvent, employing a reduction catalyst selected from VIII group metals in the Periodic Table, wherein cobalt catalyst, nickel catalyst, palladium catalyst and platinum catalyst are specifically included.

Since previous years, cyclohexenes and alkyl-cyclohexenes have been employed in various reactions as a typical cycloolefin, and thereby numerous interesting examples were discovered regarding the aforesaid reactions generally.

According to U.K. Patent No. 693,407, a reduction process is described such that a catalyst of molybdenum sulphide prepared specifically is employed, and thereby a poly-unsaturated organic compound is reduced in the range of 100° C. to 200° C. reaction temperature.

However, the reaction conditions (temperature) as well as the catalyst defined in the aforesaid process (U.K. patented process) are different from those in the process in accordance with the present invention.

The present invention relates to a novel and useful process for the preparation of cyclohexenes and alkyl-cyclohexenes by partial catalytic reduction in the presence of a metal catalyst, even though it was regarded as very difficult previously, and the industrial utilization of cyclohexenes was underdeveloped because of the absence for a process of mass production at low cost.

Subsequently, the present invention is explained more precisely as follows:

To begin with, unconjugated dihydrobenzenes as described below are employed as the raw material in accordance with the present invention:

Unsubstituted dihydrobenzene in which, for example, 1, 4-dihydrobenzene is included.
Monoalkylcyclohexadienes in which, for example, 1-methylcyclohexadiene - (3.6) and 1 - ethylcyclohexadiene-(3.6) are included.
Dialkylcyclohexadienes in which, for example, 1,2-dialkylcyclohexadiene, 1,3-dialkylcyclohexadiene and 1,4-dialkylcyclohexadiene are included.
Trialkylcyclohexadienes in which, for example, 1,3,5-trialkylcyclohexadiene and 1,3,4-trialkylcyclohexadiene are included.

In other words, unconjugated dihydrobenzenes which include unsubstituted dihydrobenzene and alkylcyclohexadienes having 1 to 3 alkyl radicals consisting of 1 to 3 carbon atoms are employed in the aforesaid process of the present invention. Of course, on some occasions, various of the above compounds may be mixed in the use of the aforesaid process. The present invention is achieved by carrying out the partial catalytic reduction wherein the aforesaid various raw materials are employed in the presence of catalyst; and all known catalysts which are selected from the VIII group metals in the Periodic Table may be employed as a catalyst.

Metal catalysts in the VIII group in the Periodic Table are publicly known as reduction catalysts and are at present employed in numerous and wide fields of industrialization. In consequence the catalysts employed in the process in accordance with the present invention can be prepared by the various processes publicly known.

But, the inventors discovered initially that, out of numerous reduction catalysts, cobalt catalyst, nickel catalyst, palladium catalyst, and platinum catalyst serve particularly the function of partial (selective) reduction when the reaction conditions of the present invention are maintained. Therefore, the aforesaid process may be regarded as a novel process to prepare cyclohexenes.

The amount of catalyst may be in the range of 0.001% to 10% by weight, based on the amount of raw materials of dihydrobenzenes; and according to the process of the present invention, the reaction may be carried out substantially, even if a solvent is absent.

In accordance with the present invention, a solvent such as saturated aliphatic, cycloaliphatic and aromatic hydrocarbon which is substantially inert to reduction may be present simultaneously in the reaction.

Hydrogen may be introduced into the reactor by a process of compressive flow or may be forced in contact with the reaction compound in the reactor wherein an additional gauge pressure acts initially.

The temperature of the reduction reaction may be remarkably varied over a wide range in accordance with the present invention and is generally in the range of zero degree C. to 100° C. or more preferably selected in the range of 10° C. to 70° C. Those reaction conditions in all cases may be variable to some extent, in compliance with the kinds of catalyst.

The various useful compounds described below, can be produced in accordance with the aforesaid reduction reaction of the present invention. Cyclohexene, 1-methylcyclohexene-(1), 1-methylcyclohexene-(3), 1-ethylcyclohexene-(1), 1-ethylcyclohexene-(3), 1-propylcyclohexene-(1), 1-propylcyclohexene-(3), 1-butylcyclohexene-(1) and 1-butylcyclohexene-(3), etc.

The formation of the aforesaid compounds may be identified confirmatively by the process of gas chromatography. When the reaction of catalytic reduction is carried out under specialized conditions, the formation of completely hydrogenated compounds may be identified.

*Example 1*

20 g. of 1,4-dihydrobenzene and 0.6 g. of Raney-nickel (W-6) were charged into a 100 cc. capacity of autoclave wherein hydrogen was compressively filled sufficiently under an initial flow of 50 atmospheric pressure and the reactants were vigorously shaken five hours at 60° C.

When the reaction was terminated completely, hydrogen was released and the filtrate separated from the catalyst by filtration was analyzed by the process of gas chromatography, whereby, 8 g. of cyclohexene, 1.3 g. of cyclohexane and unreacted 1,4-dihydrobenzene in an amount of 10.7 g. were produced.

*Example 2*

10 g. of 1,4-dihydrobenzene and 0.5 g. of palladium charcoal were charged into a 100 cc. capacity autoclave wherein hydrogen was compressively filled sufficiently under an initial flow of 50 atmospheric pressure and the reactants were vigorously shaken three hours at 18° C. to carry out a reduction reaction.

When the reaction was terminated completely, hydrogen was released out of the autoclave and the filtrate separated from the catalyst by filtration was analyzed by the process of gas chromatography whereby 9.4 g. of cyclohexene, 0.4 g. of cyclohexane and unreacted 1,4-dihydrobenzene in an amount of 0.2 g. were produced.

*Example 3*

10 g. of 1,4-dihydrobenzene, 0.1 g. of platinum asbestos and 10 g. of cyclohexane were charged into a 50 cc. capacity flask equipped with three necks, wherein hydrogen at 20° C. was flowed at a velocity of 50 cc. per minute continuously for eight hours.

When the reaction was terminated completely, the filtrate separated from the catalyst by filtration was analyzed by the process of chromatography whereby 6 g. of cyclohexene, 1 g. of cyclohexane and unreacted 1,4-dihydrobenzene in an amount of 3 g. were produced.

*Example 4*

20 g. of 1,4-dihydrobenzene and 0.6 g. of Raney-cobalt were charged into a 100 cc. capacity autoclave wherein hydrogen was compressively filled under an initial flow of 50 atmospheric pressure and the reactants were vigorously shaken at 60° C. for 5 hours to carry out a reduction.

When the reaction was terminated completely, hydrogen was released out of the autoclave and the filtrate separated from the catalyst by filtration was analyzed by the process of gas chromatography whereby 9 g. of cyclohexene, 2.1 g. of cyclohexane and unreacted 1,4-dihydrobenzene in an amount of 8.2 g. were produced.

*Example 5*

4 g. of 1-methylcyclohexadiene-(3,6) and 0.5 g. of Raney-nickel (W–6) were charged into a 100 cc. capacity autoclave, wherein hydrogen was filled sufficiently under an initial flow of 50 atmospheric pressure and the reactants were vigorously shaken at 60° C. for five hours to carry out a reduction reaction. When the reaction was terminated completely, hydrogen was released and the filtrate separated from the catalyst by filtration was analyzed by the process of gas chromatography, whereby 2.5 g. of 1-methylcyclohexene-(1) and 1 g. of 1-methylcyclohexene-(3) and unreacted 1-methylcyclohexadiene-(3,6) was produced.

*Example 6*

8 g. of 1-methylcyclohexadiene-(3,6) and 0.6 g. of palladium charcoal were charged into a 100 cc. capacity autoclave, wherein hydrogen was compressively flowed sufficiently at an initial flow of 100 atmospheric pressure and the reactants were vigorously shaken at 40° C. for one hour.

When the reaction was terminated completely, hydrogen was released and the filtrate separated from the catalyst by filtration was analyzed by the process of gas chromatography, whereby 7 g. of 1-methylcyclohexene-(1), 0.3 g. of 1-methylcyclohexene-(3), 0.4 g. of methylcyclohexane and unreacted 1-methylcyclohexadiene-(3,6) were produced.

*Example 7*

3 g. of 1-ethylcyclohexadiene-(3,6) and 0.3 g. of palladium charcoal were charged into a 100 cc. capacity autoclave wherein hydrogen was compressively flowed sufficiently at an initial flow of 60 atmospheric pressure and the reactants were vigorously shaken at 18° C. for four hours.

When the reaction was terminated completely, hydrogen was released and the filtrate separated from the catalyst by filtration was analyzed by the process of gas chromatography whereby, 2.6 g. of 1-ethylcyclohexene-(1) and 0.2 g. of ethylcyclohexane were produced and unreacted 1-ethylcyclohexadiene-(3,6) in an amount of 0.2 g. was obtained.

*Example 8*

5 g. of 1-methylcyclohexadiene-(3,6), 0.1 g. of platinum asbestos and 10 g. of cyclohexane were charged in a 50 cc. capacity flask equipped with three necks, wherein hydrogen was flowed at 20° C. at a velocity of 60 cc. per minute for eight hours.

When the reaction was terminated completely, the filtrate separated from the catalyst by filtration was analyzed by the process of gas chromatography, whereby 3.6 g. of 1-methylcyclohexene and unreacted 1-methylcyclohexadiene-(3,6) were produced.

What we claim is:

1. A process which comprises contacting a compound selected from the group consisting of 1,4-dihydrobenzene and a lower alkyl substituted 1,4-dihydrobenzene with hydrogen and a catalyst consisting essentially of at least one Group VIII metal at a temperature of about 0° to 100° C. to selectively hydrogenate said compound to yield primarily the corresponding cyclic mono-olefinic compound in preference to producing the corresponding saturated compound.

2. A process as described in claim 1, wherein the process is conducted in the presence of a solvent selected from the group consisting of a saturated aliphatic, cycloaliphatic and aromatic hydrocarbon.

3. A process as described in claim 1, wherein the metal catalyst is selected from the group consisting of Co, Ni, Pd and Pt.

4. A process as described in claim 1, wherein the hydrogen is introduced into the reaction under normal atmospheric pressure.

5. A process as described in claim 1, wherein the reaction is conducted with hydrogen under additional pressure.

6. A process as described in claim 1 where said compound is a lower alkyl substituted 1,4-dihydrobenzene having from one to three alkyl radicals each containing from one to three carbon atoms.

7. A process as described in claim 1, wherein said compound is 1,4-dihydrobenzene.

References Cited

UNITED STATES PATENTS 3,287,427   11/1966   Karol et al. _____ 260—666

OTHER REFERENCES

Chemical Abstracts 62: 3903ª, 1965 [LKh, Freedlin et al., Neflekhimiya 4 (5) 687–90, 1964 (in Russian)].

N. D. Zelinsky et al. (I) Berichte, vol. 66B, pp. 1420-2, 1933.

N. D. Zelinsky (II) Berichte, vol. 58B, pp. 1298–1303, 1925.

DELBERT E. GANTZ, *Primary Examiner.*

V. O'KEEFE, *Assistant Examiner.*